United States Patent

Campbell

[11] 3,880,854
[45] Apr. 29, 1975

[54] SELECTIVE DEHALOGENATION
[76] Inventor: Jack B. Campbell, 1809 S. Chester, Indianapolis, Ind. 46203
[22] Filed: May 10, 1974
[21] Appl. No.: 468,943

Related U.S. Application Data
[63] Continuation-in-part of Ser. No. 286,507, Sept. 5, 1972, abandoned.

[52] U.S. Cl................................................ 260/251 R
[51] Int. Cl.²................ C07D 51/18; C07D 51/28
[58] Field of Search .............................. 260/251 R

[56]  References Cited
OTHER PUBLICATIONS

Mosby, Chem. Abstracts 54, 5585h (1960).
Augustine, "Catalytic Hydrogenation," Marcel Dekker, (1965) N.Y. page 129.

Primary Examiner—Elbert L. Roberts
Attorney, Agent, or Firm—Dwight E. Morrison; Everet F. Smith

[57] ABSTRACT

An improved process for removal of halogen from the pyrimidine ring only of a compound of the formula

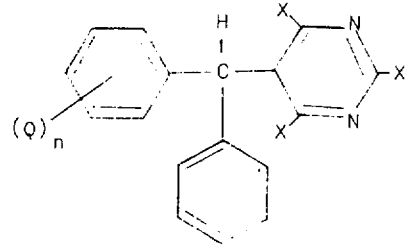

wherein
at least one of X is chlorine or bromine, the remainder hydrogen or lower alkyl;
Q is chlorine or fluorine; and
$n$ is an integer from 1 to 5.

The dehalogenation process yields an α-halophenyl-α-phenyl-5-pyrinidylmethane of 95 percent or higher purity, which compound is useful as an intermediate in the preparation of the corresponding α-halophenyl-α-phenyl-5-pyrinidylmethanol, useful as an agricultural fungicide.

4 Claims, No Drawings

SELECTIVE DEHALOGENATION

CROSS-REFERENCE

This application is a continuation-in-part of my copending application Ser. No. 286,507, filed Sept. 5, 1972, now abandoned.

BACKGROUND OF THE INVENTION

Belgian Pat. No. 714,003, teaches that compounds of the structure

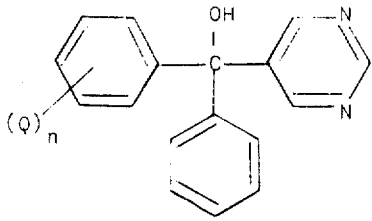

wherein Q and n have the meanings hereinbefore assigned, are useful agricultural chemicals, i.e., as plant fungicides. The compounds are difficult and costly to prepare, and a new synthetic approach to their preparation has been sought.

THE PRIOR ART

In the prior art, Augustine, in *Catalytic Hydrogenation*, page 129 (Marcel Dekker, N.Y., 1965), stated that "The removal of a halogen from an aromatic heterocycle takes place more readily than the hydrogenolysis of a phenyl halide of the same type. The relative difference between the ease of dehalogenation of a phenyl and heterocyclic halide is more pronounced over Raney nickel in basic medium than it is over palladium."

Lutz et. al., J.A.C.S., 68, 1322 (1946), selectively removed chlorine from the 4-position of 4,7-dichlorocarbostyryl, using Raney nickel and potassium hydroxide in ethanol as solvent, with hydrogen at atmospheric pressure.

Kosolapoff et al., J. Org. Chem. 26, 1895 (1961), selectively dehalogenated 2,4-dichloropyrimidine by refluxing it with zinc dust and ammonium chloride in water, until the refluxing material in the condenser just became homogeneous, to obtain 2-chloropyrimidine in 68 percent yield.

The Lutz et al. reaction conditions do not work for the dehalogenation of the instant compounds, even at somewhat higher hydrogen pressure.

Another prior art reference having to do with dehalogenation of aromatic organic compounds is Mosby, Chem. & Ind. (London), 1348–9 (1959) [Chem. Abst. 54, 5585h (1960)], who teaches the use of palladium on carbon as the catalyst together with hydrazine in ethanol or methyl cellosolve.

DESCRIPTION OF THE INVENTION

This invention relates to an improved process of selectively removing the halogens from the pyrimidyl ring while removing none of the halogens from the phenyl ring of compound I, supra, to produce a compound of the formula

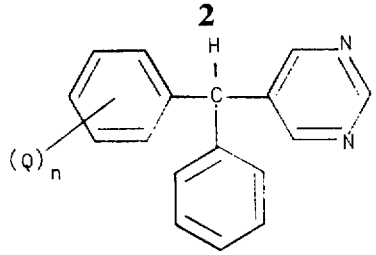

wherein Q is chlorine or fluorine, and n is an integer from 1 to 5.

More particularly this invention relates to an improved process for the dehalogenation of the pyrimidyl ring alone of compounds coming within the scope of generic formula I to yield compounds of the structure of generic formula II, supra.

One object of this invention is to obtain compounds of formula II in good yield. Another object of this invention is to obtain compounds of formula II which are at least 95 percent pure.

Compounds which can be selectively dehalogenated by the instant process include the following:

2,4-Dichloro-5-(2,4-dichlorobenzhydryl)pyrimidine
4,6-Dichloro-5-(2,4-dichlorobenzhydryl)pyrimidine
2,4-Dichloro-5-(4,4'-dichlorobenzhydryl)pyrimidine
2,4-Dichloro-5-(2,2'-dichlorobenzhydryl)pyrimidine
4,6-Dichloro-5-(4,4'-dichlorobenzhydryl)pyrimidine
2,4-Dichloro-5-(2,4-difluorobenzhydryl)pyrimidine
4,6-Dichloro-5-(2,2'-difluorobenzhydryl)pyrimidine In general, in carrying out the improved dehalogenation reaction, the hydrogen halide addition salt of the α-halophenyl-α-phenyl-3-(halopyrimidyl)methane, is dissolved or suspended in a suitable solvent, together with a hydrogen halide acceptor, and a quantity of Raney nickel catalyst, and subjected to pressure of hydrogen, at ambient room temperature, for a period of time sufficient to effect the selective dehalogenation.

The solvent used in the reaction has been determined to be important, i.e., a polar solvent being deemed most suitable as an aid in controlling the extent of dehalogenation. Thus, methanol is the solvent of choice. Other polar solvents, such as ethanol or ethyl acetate, do not provide the same type of control of the extent of dehalogenation in that mixtures of the desired product together with partially dehalogenated compounds are obtained which are difficult or impossible to separate from the desired product.

Suitable hydrogen halide acceptors include tertiary amines, such as tri($C_1$–$C_4$ alkyl)amine and pyridine, with the reagent of choice being triethylamine. Tertiary amines are preferred since they possess no active hydrogens which could react with the activated halogens of the pyrimidine ring under the instant conditions of temperature and solvent to yield pyrimidine amines or pyrimidine hydrazine derivatives. The hydrogen halide acceptor should be present in an amount at least stoichiometric with the amount of halogen halide calculated to be evolved, plus five to ten percent excess.

The catalyst used in this invention is one which is sufficiently active under the conditions of the reaction to remove halogens from the pyrimidyl ring, but not from the phenyl ring of compounds of formula I. Raney nickel catalyst has been found to be the catalyst of choice.

Commercial Raney nickel comes as a suspension in water, which suspension has a high pH. Those skilled in the art are aware that such a product, as a standard operating procedure, is subjected to washing, e.g., with methanol or ethanol, to remove water and to reduce the basicity. Thus, for use in the present invention, the commercial Raney nickel is thoroughly washed with ethanol prior to use. In this case, thorough washing means stirring with ethanol, letting stand for an hour, decanting the supernatant solvent, adding fresh ethanol, and repeating the stirring. This process is repeated hourly during two working days and the washed Raney nickel is then stored in ethanol or methanol. Such catalyst is then suitable for use in the instant invention. Best results are obtained by using this freshly washed catalyst.

The amount of catalyst required in the practice of the present invention is not critical so long as it is present in at least a five to ten percent, or perhaps slightly greater, excess by weight of the substance to be dehalogenated. Quantities of as much as 100 percent or more by weight of catalyst in excess of the weight of the compound to be dehalogenated will work, and no harm is done by such excess, except to raise the overall cost of materials.

The reaction is suitably carried out in a low-pressure hydrogenation apparatus, e.g., a Paar apparatus, at hydrogen pressures of from about 14 pounds per square inch to about 60 pounds per square inch (psi). Higher pressures tend to cause complete dehalogenation and/or destruction of the pyrimidine ring, rather than the selective dehalogenation of this invention.

The reaction is carried out at temperatures ranging from ambient room temperature to about 60°C. Temperatures higher than 60°C. tend to cause maximum dehalogenation, rather than permitting selective dehalogenation of the pyrimidine ring alone.

Reaction times of from about two hours to about eighteen hours are satisfactory, with a time of about five to six hours being preferred. Progress of the reaction can conveniently be followed by observing the change in hydrogen pressure as denoted by the gauge on the hydrogenation apparatus.

At the conclusion of the reaction, the catalyst is filtered off, washed with additional solvent, and the product isolated from the filtrate by methods well known in the art.

The compounds to be dehalogenated and identified by generic formula I, supra, are readily prepared by known methods.

The reaction of a pyrimidinone or uracil, with a diphenylmethane appropriately substituted with Q, in glacial acetic acid, catalyzed with boron trifluoride-etherate, followed by bromination with POBr$_3$ or chlorination with POCl$_3$, will yield compounds of formula I wherein X is bromine or chlorine at the 2- and 4-positions of the pyrimidine ring.

Compounds having X as bromine or chlorine in the 4- and 6-positions of the pyrimidine ring are prepared by the reaction of a diphenylmethanol, appropriately substituted with Q, with a malonic ester, or a malonamide, followed by condensation with formamidine and treatment with POBr$_3$ or POCl$_3$.

Compounds having X as bromine or chlorine in the 2,4,6-positions of the pyrimidine ring are readily prepared via the malonic ester, as set forth above, followed by condensation of the malonic ester with urea, and treatment of the 2,4,6-pyrimidine trione with POBr$_3$ or POCl$_3$, respectively.

Preparation of such α-halophenyl-α-phenyl-5-(halopyrimidyl)methane compounds useful as intermediates in the instant process is illustrated more specifically as follows.

One method of preparation involves the reaction of, for example, 2,4-dichlorobenzhydrol with uracil in glacial acetic acid in the presence of BF$_3$. This yields the 2,4-dihydroxy-5-(2,4-dichlorobenzhydryl)pyrimidine. Treatment with phosphorus oxychloride in excess yields the 2,4-dichloro-5-(2,4-dichlorobenzhydryl)-pyrimidine.

Another method of preparation is accomplished by the reaction of 2,4-dichlorobenzhydrol with malonamide in the presence of acid and BF$_3$ to yield 2,4-dichlorobenzhydrylmalonamide which in turn is allowed to react with formamide in the presence of dimethyl sulfoxide and base to yield 4,6-dihydroxy-5-(2,4-dichlorobenzhydryl)pyrimidine. This dihydroxy compound is allowed to react with excess phosphorus oxychloride to yield the 4,6-dichloro-5-(2,4-dichlorobenzhydryl)pyrimidine.

The syntheses of the compounds to be dehalogenated are illustrated by the preparations set forth hereinbelow.

PREPARATION 1

2,4-Dichloro-5-(2,4-dichlorobenzhydryl)pyrimidine

Step 1. To a mixture of 84 g. (0.75 mole) of uracil and 250 ml. of glacial acetic acid and 37.5 g. of boron trifluoride was added 189.7 g. (0.75 mole) of 2,4-dichlorobenzhydrol. The mixture was refluxed for one hour, at which time an additional 50 ml. of glacial acetic acid was added. After two hours of refluxing, an additional 10 g. of boron trifluoride was added. After three hours of refluxing, there were added 25 ml. acetic acid and 10 g. of the benzhydrol. At the end of five hours, there were added 10 g. of the benzhydrol, 25 ml. acetic acid, and 10 g. boron trifluoride. After seven hours, refluxing was stopped and the reaction product mixture was filtered and the filtrate poured onto ice and stirred. The solid material which separated was filtered off, washed twice with ether, and weighed. The yield was 170.4 g. (65 percent of theory). This product was identified as 2,4-dihydroxy-5-(2,4-dichlorobenzhydryl)-pyrimidine. M.P. 302°–306°C.

Step 2. To a mixture of 400 g. of phosphorus oxychloride and 10 g. of dimethylformamide was added 70 g. of 2,4-dihydroxy-5-(2,4-dichlorobenzhydryl)pyrimidine, prepared above, and 10 g. of dimethylformamide, and the mixture refluxed for one hour. The excess phosphorus oxychloride was removed by distillation and the reaction product mixture was then poured with stirring onto ice. The aqueous mixture was extracted with ether, the extracts combined and washed with portions of cold water. The ether solution was dried over anhydrous magnesium sulfate, the drying agent filtered off, and the ether solution concentrated. The solid material thereby obtained was recrystallized from isopropyl alcohol to yield a solid having a melting point of about 114°–115°C. Yield 38.7 g. The material was identified as 2,4-dichloro-5(2,4-dichlorobenzhydryl)-pyrimidine.

PREPARATION 2

4,6-Dichloro-5-(2,4-dichlorobenzhydryl)pyrimidine

Step 1. A mixture of 5.1 g. (0.05 mole) of malonamide, 20 ml. of 98-100 percent formic acid, 12.7 g. (0.05 mole) of 2,4-dichlorobenzhydrol, and 5 g. of boron trifluoride, was prepared and refluxed about 10–15 minutes. The reaction product mixture was poured into water, and the solids which precipitated were filtered off and washed successively with water and with ether. The product was identified by elemental analysis and NMR spectra as the desired 2,4-dichlorobenzhydrylmalonamide, having a m.p. 279°–283°C. Yield, 9.4 g. (55.6%). It was used without further purification in the next step of the synthesis.

Step 2. A mixture of 16.9 g. (0.05 mole) of 2,4-dichlorobenzhydrylmalonamide (prepared as described, supra), 60 ml. of formamide, 60 ml. of dimethylsulfoxide, and 6.0 g. of sodium methoxide was heated to 125°C. After one hour at 125°C., 1 g. of sodium methoxide was added to the reaction mixture. This addition of 1 g. of sodium methoxide was repeated at hourly intervals until a total of 8 g. of sodium methoxide had been added. Heating was continued for an additional seven hours, that is, for an overall total of 15 hours. The reaction product mixture was poured into water, and the small amount of insoluble material filtered off. The filtrate was acidified with concentrated hydrochloric acid. The solid material which precipitated was filtered off and washed successively with water and ether, and vacuum dried. The solid had a melting point of 285°–288°C. It was identified by elemental analyses and NMR spectrum as 4,6-dihydroxy-5-(2,4-dichlorobenzhydryl)pyrimidine.

Step 3. A mixture of 10.0 g. (28.8 mmoles) of 4,6-dihydroxy-5-(2,4-dichlorobenzhydryl)pyrimidine and 90 ml. of phosphorus oxychloride in a 250 ml. round bottom flask was refluxed overnight. The excess phosphorus oxychloride was removed by distillation and the reaction product mixture was poured onto a mixture of ice and chloroform. The mixture was basified (pH 8) with solid sodium carbonate. The organic layer was separated and washed with saturated aqueous sodium bicarbonate followed by water. The organic layer was dried, filtered from the drying agent, and the filtrate was evaporated in vacuo to yield an amber oil which crystallized on scratching and gave a pale yellow powder on addition of pentane. The pale yellow solid was filtered off and weighed 8.8 g. It was recrystallized from isopropyl alcohol to afford a crystalline product having a melting point of about 138°–139°C. and which was identified as 4,6-dichloro-5-(2,4-dichlorobenzhydryl)pyrimidine. Yield: 70 percent of theory.

The improved dehalogenation process of this invention is illustrated by the following examples.

EXAMPLE 1

α-(2,4-Dichlorophenyl)-α-phenyl-5-pyrimidylmethane from 4,6-dichloro-5-(2,4-dichlorobenzhydryl)pyrimidine A mixture of 3.8 g. (0.01 mole) of 4,6-dichloro-5-(2,4-dichlorobenzhydryl)pyrimidine, 100 ml. of methanol, 2.2 g. of triethylamine, and 8 g. of washed Raney nickel was placed in a 500 ml. reduction bottle and subjected to hydrogen pressure on a Paar reduction apparatus at ambient room temperature and a starting pressure of 41 psi. At the end of 13½ hours, somewhat more than the theoretical amount of hydrogen had been taken up and the reaction was shut off. The catalyst was filtered and rinsed well with methanol. The filtrate was stripped in vacuo to remove the methanol solvent leaving a gummy residue. The gummy residue was dissolved in ether, washed with water, the water layer separated, extracted two times with ether, and the combined ether extracts and original ether layer were again washed with water, dried over sodium sulfate, filtered and stripped, first at atmospheric pressure and then under full vacuum. This residue weighed 2.8 g. (90.4 percent yield). It was assayed by means of vapor-phase chromatography and shown to contain 96 percent of the desired dichloro compound.

EXAMPLE 2

α-(2,4-Dichlorophenyl)-α-phenyl-5-pyrimidylmethane from 2,4-dichloro-5-(2,4-dichlorobenzhydryl)pyrimidine A mixture of 3.8 g. (0.01 mole) of 2,4-dichloro-5-(2,4-dichlorobenzhydryl)pyrimidine, 95 ml. of methanol, 2.2 g. of triethylamine, and 4 g. of washed Raney nickel was placed in a 500 ml. reduction bottle and subjected to hydrogen pressure (45 psi. at the start) on a Paar reduction apparatus at ambient room temperature. At the end of two hours, the hydrogen pressure had become steady and the reaction was shut off. The reaction product mixture was filtered and the catalyst rinsed well with methanol. The filtrate was concentrated at reduced pressure and the residue worked up as described in Example 1, to yield α-(2,4-dichlorophenyl)-α-phenyl-5-pyrimidylmethane in 95 percent yield and of 90 percent purity as shown by vapor phase chromatography.

I claim:

1. The process of selectively dehalogenating the pyrimidyl ring of a compound of the formula

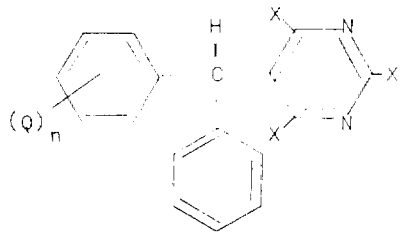

wherein
at least one of X is chlorine or bromine, the remainder hydrogen or lower alkyl;
Q is chlorine or fluorine; and
n is an integer from 1 to 5,
by contacting the compound with hydrogen in the presence of Raney nickel catalyst,
in methanol as the solvent,
in the presence of a hydrogen halide acceptor selected from the group consisting of tri($C_1$–$C_4$ alkyl)amines and pyridine, at a temperature within the range of from about ambient room temperature to about 60°C., at a hydrogen pressure of from about 14 pounds per square inch to about 60 pounds per square inch.

2. The process of claim 1 wherein the hydrogen halide acceptor is triethylamine.

3. The process of claim 1 wherein the compound contacted is 2,4-dichloro-5-(2,4-dichlorobenzhydryl)pyrimidine.

4. The process of claim 1 wherein the compound contacted is 4,6-dichloro-5-(2,4-dichlorobenzhydryl)pyrimidine.

* * * * *